J. CLARK.
PIPE COUPLING.
APPLICATION FILED APR. 28, 1909.
932,963.
Patented Aug. 31, 1909.
2 SHEETS—SHEET 2.
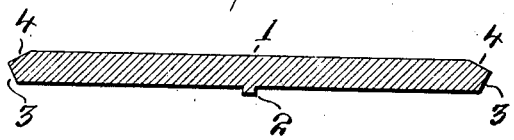
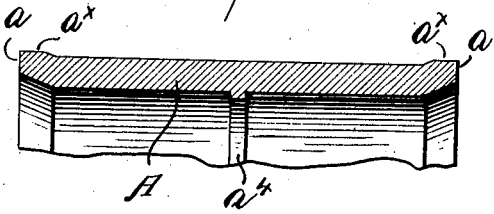
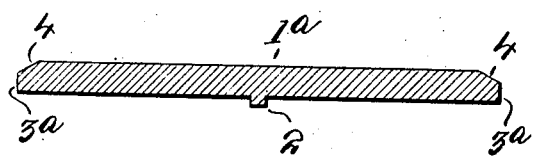
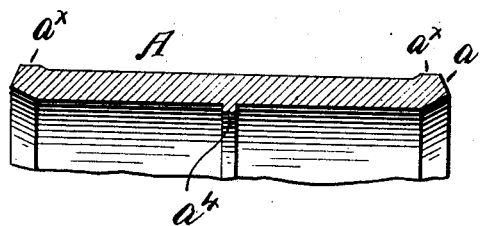
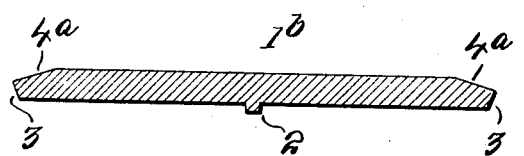
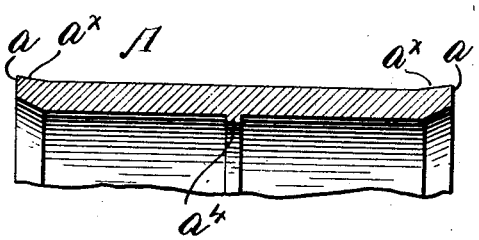
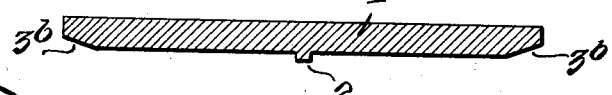
WITNESSES:
INVENTOR
James Clark
BY
Attorneys

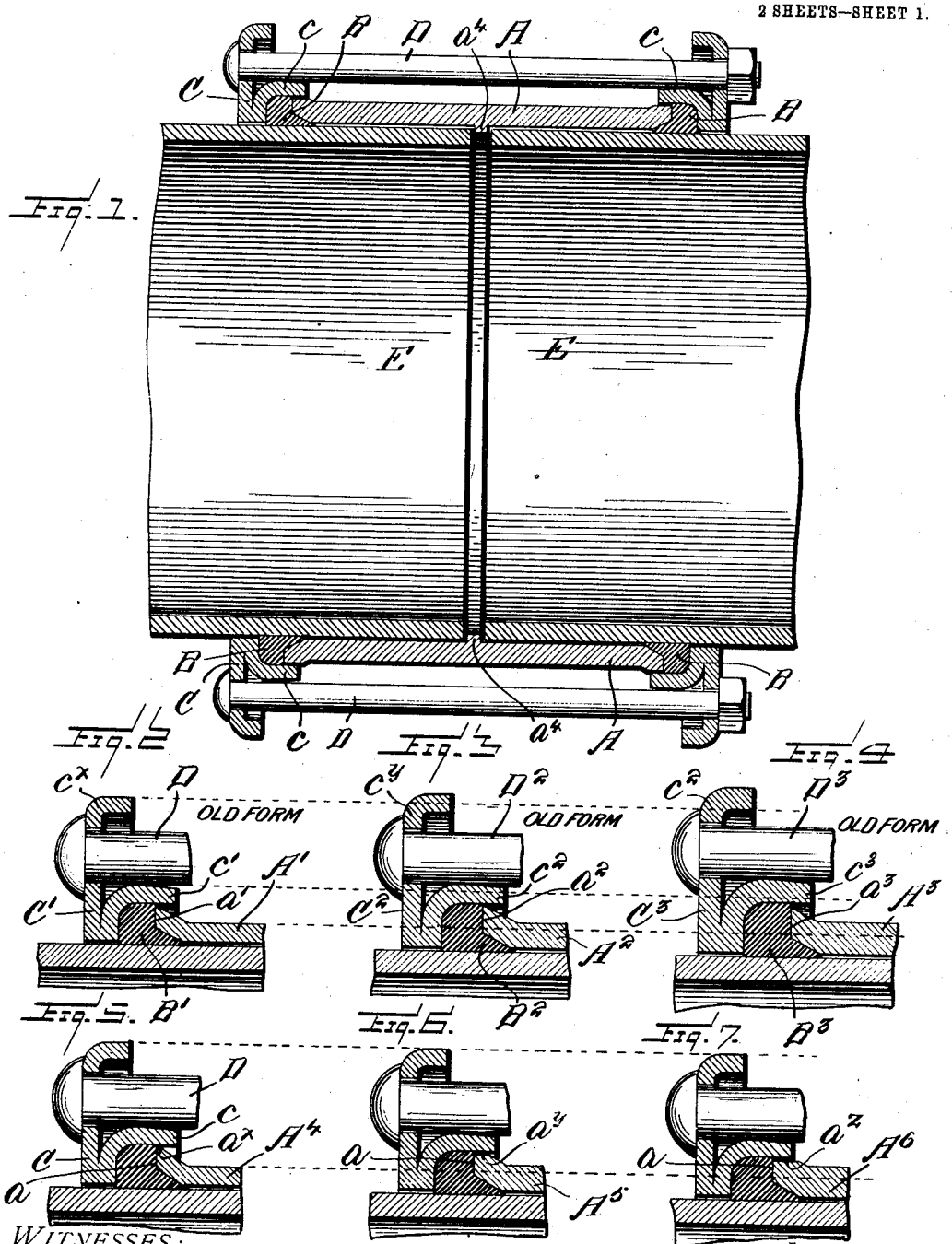

UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA.

PIPE-COUPLING.

932,963.     Specification of Letters Patent.     Patented Aug. 31, 1909.

Application filed April 28, 1909. Serial No. 492,698.

*To all whom it may concern:*

Be it known that I, JAMES CLARK, citizen of the United States, residing at Bradford, in the county of McKean and State of Pennsylvania, have invented certain new and useful Improvements in Pipe-Couplings; and I do hereby declare the following to be a full, clear, and exact description of the invention, such as will enable others skilled in the art to which it appertains to make and use the same.

My invention consists in the novel features hereinafter described reference being had to the accompanying drawings which illustrate the invention and it is fully disclosed in the following description and claims.

Referring to the accompanying drawings, Figure 1 represents a sectional view of a coupling for plain end pipe sections having my present invention embodied therein. Figs. 2, 3 and 4 are similar detail views showing portions of a coupling in use before my invention and illustrating the variations in the size of packing and clamping rings to accommodate middle rings of the same internal diameter but formed of different thicknesses of metal. Figs. 5, 6 and 7 are similar views showing the application of my invention to middle rings of the different thicknesses as those shown in Figs. 2, 3 and 4. Figs. 8, 10 and 12 are sectional views of various forms of skelp for middle rings which I may employ in carrying my invention into effect, and Figs. 9, 11 and 13 are partial sectional views of the middle rings made from such skelps, respectively. Fig. 14 is a sectional view of another form of skelp, which I may employ in the manufacture of middle rings embodying my invention.

My invention relates to that class of detachable pipe couplings known in the art as rubber packed pipe couplings and designed especially for the coupling of pipe or casing sections having plain or unthreaded ends. Such couplings comprise among their members, as shown in Fig. 1 for example, the "middle ring" A, which overlaps the meeting ends of the pipe sections and is ordinarily provided with a "centering stop" $a^4$ to center the ring over the meeting ends and with flanged or outwardly flared portions at its ends forming packing recesses; a packing ring B for engaging the packing recesses at each end of the middle ring A and the end faces of the middle ring, said packing rings being usually formed of rubber; a clamping ring C for engaging and inclosing each packing ring and forcing it into engagement with the end of the middle ring and the exterior of the adjacent pipe section which it surrounds, and bolts D connecting the clamping rings for drawing them toward each other to compress the packing rings B, B. E, E represent two plain end pipe sections to be connected by the coupling. These couplings are of necessity made in a great variety of sizes to fit pipe sections a fractional part of an inch in diameter up to several feet in diameter. The middle rings of the couplings for the various sizes of pipe are also made of various thicknesses of metal, according to the pressure the pipe line is to be subjected to in use. It is also desirable to have the flange member $c$ of the clamping ring C fit very closely over the flared end of the middle ring so as to completely inclose the packing ring B and practically hermetically seal it when it is in the ground thus protecting the rubber packing and causing it to last indefinitely. Where the middle rings of a given size are made of different thicknesses of material it necessitates the manufacture of a different shaped clamping ring, for each thickness of middle rings, and a different size of rubber packing ring for each different thickness of the middle rings.

In Figs. 2, 3 and 4 I have illustrated in detail three sections of portions of couplings of the character described, all designed for pipe of the same standard size, but having middle rings of three different thicknesses, as $\frac{1}{4}$, $\frac{5}{16}$ and $\frac{3}{8}$ inch, for example. It will be seen by reference to the dotted lines extending across the figure that the clamping ring $C^2$ in Fig. 3 must have its flange portion $c^2$ of greater internal diameter than the corresponding flange $c'$ in Fig. 2 to fit over the end of the middle ring $A^2$ and must have its plate member $c^v$ correspondingly enlarged to permit the bolt hole to be moved outward similarly. Again in Fig. 4 it will be noticed that the flange $c^3$ must be still further enlarged to fit over the end of the thicker middle ring $A^3$ and the plate member $c^x$ must be correspondingly enlarged. It will also be seen from these figures that the end faces $a'$, $a^2$, $a^3$ of the middle rings $A'$, $A^2$, $A^3$ are of different widths, and that the packing rings $B'$, $B^2$, $B^3$ must be enlarged to provide wider faces corresponding with the faces $a'$, $a^2$, $a^3$ and also to compensate for the enlargement of the flanges of the clamping rings.

It is obvious that the manufacture of couplings of the same standard size, in a series of sub-sizes to accommodate different thicknesses of middle ring increases enormously the cost of manufacture, as each sub-size requires special dies for its production (where wrought metal parts are used) or special patterns where cast rings are employed, and further, a larger amount of rubber is employed than is strictly necessary to secure a tight joint, and this additional amount of rubber is an extremely costly item especially in the large sizes.

According to my invention the external diameter of the flared portion of the middle rings of each standard size is made uniform, no matter what the thickness of the ring wall is, and further the end faces of the middle rings of each size are made of a predetermined width, no matter what the thickness of the ring wall is, the predetermined width of face being preferably slightly less than the minimum thickness of wall, of middle rings of that size. Thus in Figs. 5, 6 and 7 I have shown my invention applied to couplings having middle rings $A^4$, $A^5$, $A^6$ of the same varying thicknesses respectively as are illustrated in Figs. 2, 3 and 4 and it will be noted that the outer edge of the flared portion of the middle ring is cut off more or less as required, as indicated at $a^x$, $a^y$, $a^z$, to produce a substantially cylindrical face which is therefore substantially parallel to the periphery of the ring, thus enabling any one of the middle rings to be inserted within the flange member $c$ of a clamping ring C which is the same size and shape for all thicknesses of the ring. It will also be noted that the end faces $a$ of the middle rings $A^4$, $A^5$, $A^6$ which extend substantially perpendicular to the axis of the ring, are of the same width for all thicknesses of ring and of less width than the thickness of the ring, so that the same rubber packing ring B is used for all the thicknesses of the middle ring. My invention, therefore, effects novel and extremely valuable results in dispensing with the necessity of a different clamping ring for each sub-size of each standard size of middle rings and secondly in saving a considerable amount of rubber in the packing rings.

I prefer to form the middle rings, as well as the clamping rings of wrought metal, such as wrought iron or steel, and the middle rings are preferably formed from a skelp or bar of wrought metal, of peculiar cross section, which is bent into circular form and welded, and the end portions of the ring are then usually expanded so that the bending of the end portions outwardly will produce the desired configuration at each end.

Thus in Fig. 8 I have shown a section of a skelp 1 which I prefer to use in forming the middle ring. The skelp is a flat bar having preferably a projecting longitudinal bead 2 substantially the center of one face which I term the inner face, and the outer edges 3, 3 inclined or beveled toward the beaded face. The face of the skelp not provided with the bead (the outer face) is also beveled as at 4, 4 at each edge. When this skelp is made into a ring, and the ends bent outward, the form shown in section in Fig. 9 (and in Figs. 1, 5, 6 and 7) is produced.

Fig. 10 illustrates a slight modification of the skelp $1^a$ in which the lateral edges $3^a$, $3^a$ are perpendicular to the inner or beaded face, the outer face only being beveled at 3, 3, and Fig. 11 illustrates a partial section of the ring made therefrom which also embodies my invention.

Fig. 12 illustrates another form of skelp $1^b$ in which the lateral edges 3 are beveled as in Fig. 8, but the outer face is provided with longer beveled portions $4^a$. Fig. 13 represents a partial section of a ring made from this skelp which also embodies my invention. In this instance the outer periphery of the flanged portion of the middle ring is angular instead of parallel with the outer surface of the ring.

Fig. 14 represents a section of a skelp in which a very long bevel $3^b$, $3^b$ is provided at the edges of the inner face. This skelp is treated by an upsetting process to expand the ends and either of the forms of ring shown in Figs. 9, 11 and 13 may be produced according to the shape of the die employed.

What I claim and desire to secure by Letters Patent is:—

1. In a pipe coupling for plain end pipe sections, the combination with the middle ring having its end portions flared outwardly and provided with end faces disposed at an angle to the axis of the ring and of less width than the thickness of the ring wall, clamping rings provided with flange members encircling the outer edges of the flared portions of the middle ring, packing rings lying within the flange members of said clamping rings, between them and the adjacent end of the middle ring and bolts connecting said clamping rings.

2. In a pipe coupling for plain end pipe sections, the combination with the middle ring having its end portions flared outwardly and provided with end faces disposed at an angle to the axis of the ring and of less width than the thickness of the ring wall, the outer peripheral edges of said outwardly flared portions of the middle ring being cylindrical, clamping rings provided with annular flange members encircling the cylindrical surfaces of the outwardly flared portions of the middle ring, packing rings lying within the said annular flange members of the clamping rings, and having portions extending within the flared portions of the adjacent end of the middle ring, and faces engaging the end faces of the middle ring and bolts connecting the clamping rings.

3. In a pipe coupling for plain end pipe sections, the combination with the middle ring formed of wrought metal and having its wall of substantially uniform thickness, said ring being provided at each end with outwardly bent annular portions forming packing recesses within them and end faces disposed substantially perpendicular to the axis of the ring, the said outwardly bent end portions having their outer peripheral portions formed by a cylindrical face substantially parallel to the wall of the ring and said end faces being of less width than the thickness of the ring wall, of packing rings each having an inclined portion to engage the packing recess of the middle ring and a face substantially perpendicular to the axis of the ring to engage the end face of the middle ring, clamping rings each having an annular flange member forming a packing recess to engage one of the packing rings, the outwardly bent portions of the middle ring lying within the said annular flange members of the clamping rings, and bolts connecting said flange members.

In testimony whereof I affix my signature, in the presence of two witnesses.

JAMES CLARK.

Witnesses:
 H. M. WICK,
 M. E. CLARK.